United States Patent
Xu et al.

(10) Patent No.: US 7,386,641 B2
(45) Date of Patent: Jun. 10, 2008

(54) PROTOCOL FOR UNCOMPRESSED MULTIMEDIA DATA TRANSMISSION

(75) Inventors: Mingcheng Xu, Simi Valley, CA (US); Yong Guo, Irvine, CA (US); Shing-Wu P. Tzeng, Fountain Valley, CA (US)

(73) Assignee: OWLink Technology, Inc., Irvine, CA (US)

( * ) Notice: Subject to any disclaimer, the term of this patent is extended or adjusted under 35 U.S.C. 154(b) by 282 days.

(21) Appl. No.: 11/406,558

(22) Filed: Apr. 18, 2006

(65) Prior Publication Data
US 2008/0005310 A1   Jan. 3, 2008

(51) Int. Cl.
G06F 3/00 (2006.01)
G06F 15/00 (2006.01)

(52) U.S. Cl. ............... 710/19; 709/231; 709/233; 725/98; 725/118

(58) Field of Classification Search ............ 710/18–19; 709/223–224, 231–233; 725/80–85, 98–101, 725/118–119
See application file for complete search history.

(56) References Cited

U.S. PATENT DOCUMENTS

| | | | |
|---|---|---|---|
| 5,325,423 A | | 6/1994 | Lewis |
| 5,390,269 A | | 2/1995 | Palecek et al. |
| 5,481,634 A | | 1/1996 | Anderson et al. |
| 5,890,162 A | * | 3/1999 | Huckins ............ 707/104.1 |
| 6,019,520 A | | 2/2000 | Lin et al. |
| 6,151,432 A | | 11/2000 | Nakajima et al. |
| 6,347,889 B1 | | 2/2002 | Cheng |
| 6,353,169 B1 | | 3/2002 | Juszkiewicz et al. |
| 6,524,015 B1 | | 2/2003 | Cheng |
| 6,637,948 B2 | | 10/2003 | Shirai et al. |
| 6,686,530 B2 | | 2/2004 | Juszkiewicz et al. |
| 7,034,891 B2 | | 4/2006 | Joung et al. |
| 2001/0012428 A1 | | 8/2001 | Nakajima et al. |
| 2003/0039002 A1 | | 2/2003 | Toriumi et al. |
| 2003/0123659 A1 | * | 7/2003 | Forstrom et al. ............ 380/205 |
| 2003/0133674 A1 | | 7/2003 | Fujita et al. |

(Continued)

FOREIGN PATENT DOCUMENTS

JP   2003-029096 A   1/2003

(Continued)

OTHER PUBLICATIONS

Converters Overview, AJA Video Systems, [online], [retrieved on Oct. 3, 2006]. Retrieved from the Internet <URL: http://www.aja.com/html/products_converters_HDP.html>.

(Continued)

*Primary Examiner*—Christopher B. Shin
(74) *Attorney, Agent, or Firm*—Fenwick & West LLP

(57) ABSTRACT

A serial transmission protocol and architecture are provided that can be used to transmit uncompressed multimedia (e.g., video/audio/control data) over a high speed serial forward communication channel. A backward channel is also provided, for communicating control data. The protocol is implemented with a flexible packet format that supports all different modes of video data, and also supports 24 bit and 30 bit video data (or higher). An example application where the architecture and protocol can be used is a home entertainment multimedia system. A mechanism to implement EDID pass-through and protocols such as HDCP is also provided.

23 Claims, 7 Drawing Sheets

U.S. PATENT DOCUMENTS

| | | |
|---|---|---|
| 2003/0147010 A1 | 8/2003 | Joung et al. |
| 2003/0147650 A1 | 8/2003 | Hwang et al. |
| 2005/0053379 A1 | 3/2005 | Jockerst et al. |
| 2005/0055483 A1* | 3/2005 | Devlin et al. ............... 710/68 |
| 2006/0153503 A1 | 7/2006 | Suzuki et al. |
| 2006/0153504 A1 | 7/2006 | Suzuki et al. |
| 2007/0143801 A1* | 6/2007 | Madonna et al. ............ 725/80 |

FOREIGN PATENT DOCUMENTS

| | | | |
|---|---|---|---|
| JP | 2003-167166 A | 6/2003 |
| JP | 2003-264513 A | 9/2003 |
| KR | 1020040007858 A | 1/2004 |

OTHER PUBLICATIONS

HDMI Switch targets dual display theater systems, ThomasNet, [online], [retrieved on Oct. 3, 2006]. Retrieved from the Internet <URL: http://news.thomasnet.com/fullstory/491909/148>.

Somers, Steve, DVI and HDMI: The Short and the Long of It, Extron Electronics, [retrieved on Oct. 3, 2006]. Retrieved from the Internet <URL: http://www.extron.com/company/article.aspx?id=dvihdmi_ts>.

HDV15 Features and Specifications, Zektor Hometheater Switches, [online], [retrieved on Oct. 3, 2006]. Retrieved from the Internet <URL: http://www.zektor.com/hdvi5/specs.htm>.

Frequently Asked Questions, Gateway Corporation, [online], [retrieved on Sep. 28, 2005]. Retrieved from the Internet <URL: http://support.gateway.com/s/CsmrEltrncs/Shared/2517984faq67.shtml>, pp. 1-2.

* cited by examiner

PROTOCOL FOR UNCOMPRESSED MULTIMEDIA DATA TRANSMISSION

RELATED APPLICATIONS

This application is related to U.S. application Ser. No. 11/406,875, filed Apr. 18, 2006, and titled "EDID Pass Through via Serial Channel," which is herein incorporated in its entirety by reference.

FIELD OF THE INVENTION

The invention relates to communication systems, and more particularly, to a protocol for uncompressed multimedia data transmission.

BACKGROUND OF THE INVENTION

Serial interfaces have been widely used in data communication protocols. In these protocols, data are serialized and transmitted over optical fiber, wireless, copper wires, or other mediums. These protocols can be used, for example, to carry computer data files, voice data, and compressed video data.

Traditionally, most communication systems transmit multimedia data in compressed format. With such compressed data transmission systems, multimedia data is first compressed at the source. The compressed data is then transmitted over the serial communication link. At the destination, the data is decompressed and recovered before being displayed/sounded. The compress-transmit-decompress process of such protocols adds system complexity and cost. In addition, some content details may be lost by the compression and decompression process.

DVI (digital visual interface) or HDMI (high definition multimedia interface) protocols are used to transmit uncompressed video/audio data. However, these protocols require multiple pairs of wires to carry clock data and three components of the video signals (RGB or YCrCb), which makes the cable that interconnects the source and display devices very costly. In addition, limits in transmission distance also restrict the application of the DVI and HDMI protocols.

There is a need, therefore, for serial transmission protocols that can transmit uncompressed multimedia over a high speed serial communication channel.

SUMMARY OF THE INVENTION

One embodiment of the present invention provides a method for dynamically updating addresses of daisy-chained devices in an uncompressed multimedia communication system. The method includes receiving at a downstream device uncompressed multimedia data serially transmitted over a single communication channel from an upstream device. The received data is in a data format that specifies upstream device address. The method continues with detecting at the downstream device that the address of the upstream device has changed, and then automatically adjusting the address of the downstream device based on the upstream device address. The uncompressed multimedia communication system may include, for example a plurality of source devices (e.g., DVD players, set-top boxes, etc) and/or a plurality of sink devices (e.g., digital TVs, projectors, etc). In one particular embodiment, the multimedia system is configured for transmission of multiple uncompressed multimedia streams in the single communication channel, and the data format further specifies to which stream each multimedia packet belongs. In one such case, the downstream device is a sink device and the method further includes comparing at the sink device a received stream number with a programmed stream number associated with the sink device, and providing multimedia data having a stream number that matches the programmed stream number to local video/audio processing circuitry. In another such case, the method further includes relaying multimedia data having a stream number that does not match the programmed stream number to a next downstream device. A programmed stream number can be assigned to the sink device, for example, by detecting available multimedia streams, displaying a list of the available multimedia streams, receiving a user stream selection, and assigning the programmed stream number to the sink device based on the user stream selection. In another particular embodiment, the data format further specifies timing information between a source device and a sink device. In one such case, the method further includes receiving (at the sink device) control signal change data including control signal values and time at which each change occurs relative to a first pixel time of each packet received (or other initial data from which a count can be referenced), counting pixels from first pixel for each data packet received, and regenerating control timing signal for each packet based on pixel count. In another such case, the method further includes detecting at the source device control signal change data, counting pixels from first pixel for each data packet received, recording control signal change data including control signal values and time at which each change occurs relative to a first pixel time of each packet received, and forwarding the control signal change data to the sink device.

Another embodiment of the present invention provides a machine-readable medium (e.g., one or more compact disks, diskettes, servers, memory sticks, or hard drives) encoded with instructions, that when executed by one or more processors, cause the processor to carry out a process for dynamically updating addresses of daisy-chained devices in an uncompressed multimedia communication system. This process can be, for example, similar to or a variation of the previously described method.

Another embodiment of the present invention provides an uncompressed multimedia communication system for dynamically updating addresses of daisy-chained devices. The system includes an interface for receiving at a downstream device uncompressed multimedia data serially transmitted over a single communication channel from an upstream device. The received data is in a data format that specifies upstream device address. The system further includes a control processor for detecting (at the downstream device) that the address of the upstream device has changed, and for automatically adjusting the address of the downstream device based on the upstream device address. The uncompressed multimedia communication system may include, for example, a plurality of source devices and/or a plurality of sink devices. In one particular embodiment, the multimedia system is configured for transmission of multiple uncompressed multimedia streams in the single communication channel, and the data format further specifies to which stream each multimedia packet belongs. In one such case, the downstream device is a sink device and the control processor is further configured for comparing at the sink device a received stream number with a programmed stream number associated with the sink device, and for providing multimedia data having a stream number that matches the programmed stream number to local video/audio processing circuitry. In another such case, the control processor is further configured for relaying multimedia data having a stream number that does not match the programmed stream number to a next downstream device. A programmed stream number can be assigned, for example, by the control processor to the sink device. In one such case, the control processor is further configured for detecting available multimedia streams, providing a list of the available multimedia streams for display, receiving a user stream selection, and assigning the programmed stream number to the sink device based on the user stream selection. In another particular embodiment, the data format further specifies timing information between a source device and a sink device. In one such case, the control processor is further configured for receiving at the sink device control signal change data including control signal values and time at which each change occurs relative to a first pixel time of each packet received, counting pixels from first pixel for each data packet received, and regenerating control timing signal for each packet based on pixel count. In another such case, the control processor is further configured for detecting at the source device control signal change data, counting pixels from first pixel for each data packet received, recording control signal change data including control signal values and time at which each change occurs relative to a first pixel time of each packet received, and forwarding the control signal change data to the sink device. The system functionality can be implemented, for example, in software (e.g., executable instructions encoded on one or more computer-readable mediums), hardware (e.g., gate level logic or one or more ASICs), firmware (e.g., one or more microcontrollers with I/O capability and embedded routines for carrying out the functionality described herein), or some combination thereof. Many suitable means for implementing embodiments of the present invention will be apparent in light of this disclosure.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF THE INVENTION

Figure 1:
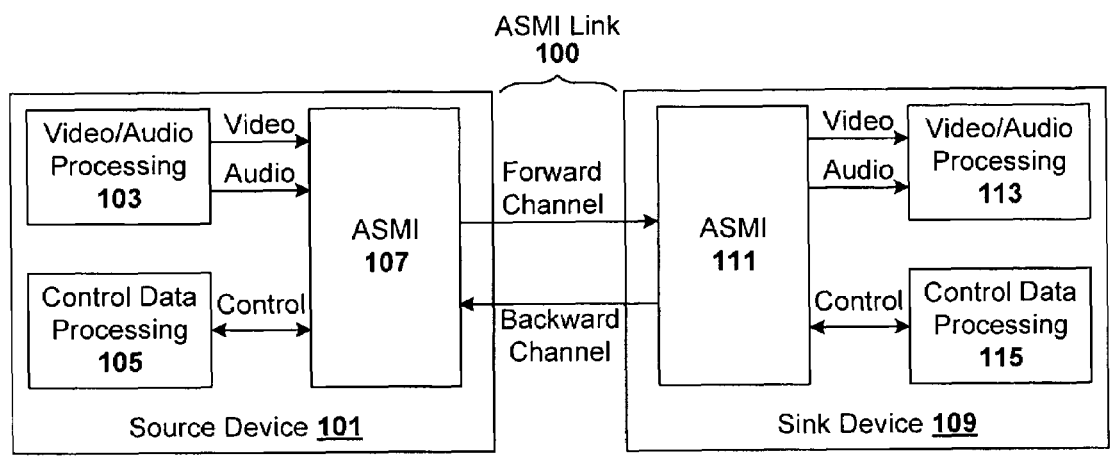
FIG. 1 is a block diagram of an uncompressed multimedia data communication system, configured in accordance with an embodiment of the present invention.

A serial transmission protocol and architecture are provided that can be used to transmit uncompressed multimedia (e.g., video/audio/control data) over a high speed serial forward communication channel. A backward channel is also provided, for communicating control data. The communication channel (including forward and backward channels) can be implemented with wired or wireless of technology (or a combination thereof). The protocol is implemented with a flexible packet format that supports all different modes of video data, and also supports 24 bit or more (e.g., 30 bit) video data. An example application where the architecture and protocol can be used is a home entertainment multimedia system. A mechanism to implement EDID pass-through and protocols such as HDCP is also provided.

General Overview

Uncompressed multimedia data transmission for video/audio is asymmetrical in nature. There are many video/audio formats for uncompressed video. Examples include 480p, 720p, 1080i, NTSC, PAL etc. Although most digital video equipment today transmits 24 bit videos, there is trend to increase the number of bits per pixel in the near future.

In any such cases, video and audio data are transmitted from the source to destination. There is also a relatively low bandwidth data transmission in the opposite direction for status exchange and control functions. A video/audio application typically requires very high bandwidth. For instance, videos in 1080i mode need over 1.5 GBPS bandwidth of net transmission rate. The requirement can be over 2 GBPS including audio data, control data, in addition to the transmission overhead and coding overhead. Besides video data, there are also a number of video timing and control signals, such as Hsync and Vsync. Such signals are transmitted from the source to the destination for correct video/audio signal regeneration.

One embodiment of the present invention is a protocol that enables a very high bandwidth (e.g., 1.5 GBPS or higher) in one direction for video/audio and other control data. The transmission link in this direction is called a forward channel. The protocol also enables a relatively low speed communication link in the opposite direction. It is called a backward channel. The protocol can be configured to support all the available formats, and is very flexible, so that adoption of new formats is facilitated. Control and timing signals can be carried from the source to the destination for correct video/audio signal regeneration.

The protocol is herein referred to as the Asymmetrical Serial Multimedia Interface (ASMI) protocol, since it has a high bandwidth requirement in one direction and a low bandwidth requirement in the other. The protocol can be transmitted, for example, via a digital optical fiber link, digital optical wireless link, or a radio frequency (RF) link.

Similarly, a combination of such links can be used, such as a high speed optical wireless link for the forward channel and a relatively slower speed RF link for the backward channel.

The protocol can be used in conjunction with a number of system configurations. In one particular embodiment, a multimedia system configured with a daisy-chain topology. The system is capable of transmitting uncompressed multimedia data, and includes multiple sources and/or sink devices. The multimedia system can be configured with an automatic and dynamic addressing assignment scheme that allows a user to rewire source and/or sink device cables, wherein all addressing for all networked devices automatically updates to maintain reliable communication. Other system configurations, such as point-to-point and media center configurations, can also be implemented with the protocol.

The protocol can also be used in conjunction with a multimedia system configured for transmission of multiple uncompressed multimedia streams in one serial communication channel. Techniques for selecting a target stream (e.g., based on assigned stream numbers) for display/sounding are also provided. The protocol can also be used in conjunction with a multimedia system configured to use time stamps in uncompressed video transmission, wherein one serial link is used to carry all data and timing information from the source-side to the sink-side, and a time stamp mechanism allows the sink-side to regenerate all original control timings.

Another embodiment of the present invention provides a multimedia system configured for EDID (Extended Display Identification Data) or E-EDID (Enhanced Extended Display Identification Data) pass-through over the ASMI described herein. Other embodiments will be apparent in light of this disclosure. For instance, a mechanism to implement HDCP (high-bandwidth digital content protection) and other such protocols over the ASMI is also provided. The disclosed techniques can be used to improve reliability, speedup recovery process, and may also include the use of sequence numbers for sink/source synchronization.

System Architecture

FIG. 1 is a block diagram of an uncompressed multimedia data communication system, configured in accordance with an embodiment of the present invention.

As can be seen, the system includes a source device 101 and a sink device 109 communicatively coupled via an asymmetric serial multimedia interface (ASMI) link 100. The source device 101 can be, for example, a DVD player, satellite/cable receiver box or set-top box, computer, or other suitable multimedia source. The source device 101 generates multimedia data and sends it via the ASMI link 100. The sink device 109 can be, for example, a digital television, monitor, projector or other suitable display device. The sink device 109 receives multimedia data via the ASMI link 100 and displays that data.

In the example embodiment shown in FIG. 1, the source device 101 includes an ASMI section 107, a video/audio processing section 103, and a control data processing section 105. The video/audio processing section 103 can be in the same device as the ASMI section 107 (as shown in FIG. 1). In alternative embodiments, the section 103 can be in a separate device that is operatively connected to the source device 101 via a standard DVI/HDMI cable (or other suitable interconnect). Likewise, the control data processing section 105 can be in the same device as the ASMI section 107 (as shown in FIG. 1). In alternative embodiments, section 105 can be in a separate device that is operatively coupled with the source device 101.

Likewise, the sink device 109 includes an ASMI section 111, a video/audio processing section 113, and a control data processing section 115. The video/audio processing section 113 can be in the same device as the ASMI section 111 (as shown in FIG. 1). In alternative embodiments, the section 113 can be in a separate device that is operatively connected to the sink device 109 via a standard DVI/HDMI cable (or other suitable interconnect). Likewise, the control data processing section 115 can be in the same device as the ASMI section 111 (as shown in FIG. 1). In alternative embodiments, section 115 can be in a separate device that is operatively coupled with the sink device 109.

In operation, the video/audio processing section 103, which can be implemented with conventional technology (e.g., such as that included in a DVD player, satellite/cable receiver box or set-top box, or computer) generates multimedia data (e.g., audio and video), and provides that data to the ASMI section 107. In addition, the control data processing section 105, which can be implemented in part with conventional technology (e.g., such as that included in a DVD player, satellite/cable receiver box or set-top box, or computer) generates control data, and provides that data to the ASMI section 107. The control data processing section 105 of this particular system is further configured in accordance to provide additional control functions in accordance with an embodiment of the present invention, as will be apparent in light of this disclosure. These additional control functions can be implemented within the control data processing section 105, or in a separate control processor module that supplements conventional control functions. The multimedia and control data is multiplexed into a serial stream by the ASMI section 107, and then transmitted to the ASMI section 111 (of the sink device 109) via the forward channel of the ASMI link 100.

The ASMI section 111 demultiplexes the received serial stream back into its multimedia (video and audio) and control data components. The video and audio data are provided to the video/audio processing section 113, which can be implemented with conventional technology (e.g., such as that included in a digital TV, monitor, or projector). The video/audio processing section 113 processes that multimedia data so that it can be displayed/sounded to the user. In addition, the received control data is provided to the control data processing section 115, which can be implemented in part with conventional technology (e.g., such as that included in a digital television, monitor, projector or other suitable display device). The control data processing section 115 is further configured in accordance to provide additional control functions in accordance with an embodiment of the present invention, as will be apparent in light of this disclosure. These additional control functions can be implemented within the control data processing section 115 of the sink device 109, or in a separate control processor module that supplements conventional control functions. The control data supports and otherwise enables, for example, the processing of the multimedia data into the original video/audio, the processing of remote control and other user control functions, and the processing of other data applications, as will be explained in turn.

Control data can also be provided from the sink device 109 to the source device 101 via the backward channel. In particular, control data processing section 115 provides control data to the ASMI section 111, which multiplexes that control data for transmission to the ASMI section 107 (of the source device 101). ASMI section 107 then demultiplexes the received control data. That control data is then provided to the control data processing section 105. The ASMI section 107 will be discussed in more detail with reference to FIG. 2a, and the ASMI section 111 will be discussed in more detail with reference to FIG. 2b.

The ASMI link 100 can be implemented using conventional or custom technology (e.g., optical, RF, or combination), and can be wired or wireless or a combination of the two if so desired. In one particular embodiment, the forward and backward channels of the ASMI link 100 are implemented using a pair of optical transceivers communicatively coupled by a single fiber as described in the U.S. patent application Ser. No. 11/173,409. This application Ser. No. 11/173,409, filed on Jun. 30, 2005 and titled, "Bidirectional HDCP Transmission Module Using Single Optical Fiber," is herein incorporated in its entirety by reference. In such an embodiment, the ASMI section 107 could include or otherwise be coupled with a transceiver module (e.g., VCSEL and photodetector) for implementing the forward channel transmitter and the backward channel receiver. Also, the ASMI section 111 could include or otherwise be coupled with a transceiver module (e.g., LED and PIN detector) for implementing the backward channel transmitter and the forward channel receiver. Numerous wired optical transceiver configurations can be used to effect communication between the devices 101 and 109.

In another particular embodiment, the forward and backward channels of the ASMI link 100 are implemented using an optical wireless communication channel as described in the U.S. patent application Ser. No. 11/142,882. This application Ser. No. 11/142,882, filed on May 31, 2005 and titled, "High Speed Free Space Optical Detection with Grating Assisted Waveguide," is herein incorporated in its entirety by reference. In such an embodiment, the ASMI section 107 could include or otherwise be coupled with a transceiver module (e.g., transmitter with grating assisted receiver) for implementing the forward channel transmitter and the backward channel receiver. Also, the ASMI section 111 could include or otherwise be coupled with a transceiver module (e.g., transmitter with grating assisted receiver) for implementing the backward channel transmitter and the forward channel receiver. In such a case, the ASMI link 100 is actually a forward communication link and a backward communication link. Numerous wireless optical transceiver configurations can be used to effect communication between the devices 101 and 109.

In another such embodiment, the forward channel can be implemented using any wireless optical link (such as a VCSEL and PIN detector), and the backward channel can be implemented with a relatively slower RF link (e.g., such as an IEEE 802.11 or other such RF wireless communication link).

ASMI for Source Device

Figure 2A:
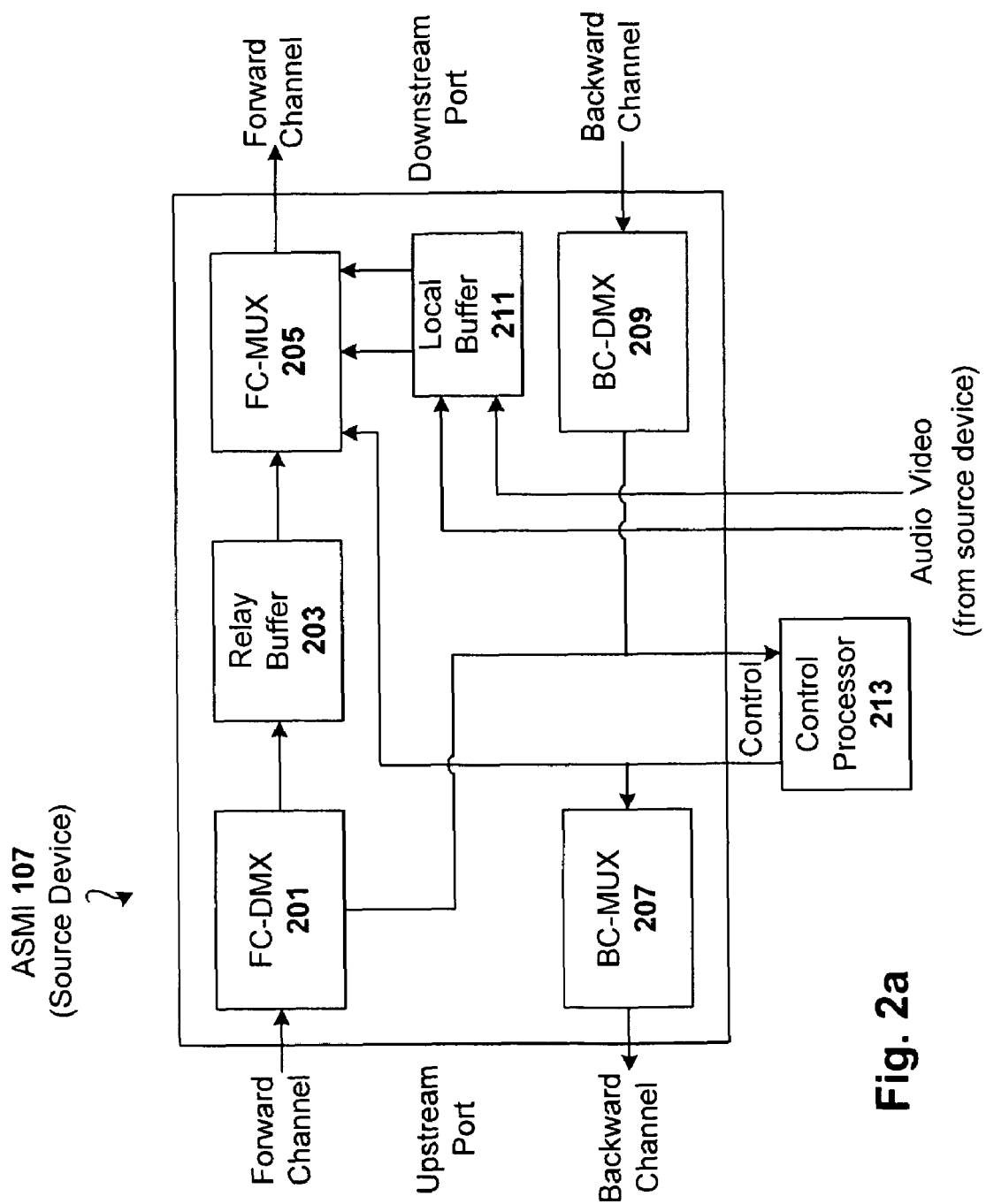
FIG. 2a is a block diagram of an asymmetrical serial multimedia interface (ASMI) for the source device of FIG. 1, configured in accordance with an embodiment of the present invention.

FIG. 2a is a block diagram of an ASMI 107 for the source device of FIG. 1, configured in accordance with an embodiment of the present invention. As previously explained, ASMI 107 can exist independently of the source device in other embodiments, if so desired.

This example ASMI 107 has a downstream port and an optional upstream port. The downstream port includes a high speed forward channel transmission port and a low speed backward channel receiving port. The optional upstream port, which includes a low speed backward channel transmission port and a high speed forward channel receiving port, can receive video/audio signals from an upstream source device in a daisy-chain configuration, as will be discussed in turn.

In operation, the ASMI 107 receives video and audio data from a local video/audio source (e.g., video/audio processing section 103, such as that included in a DVD player or other such source). The video and audio data is saved into an elastic buffer called local buffer 211. The ASMI 107 has a forward channel multiplexer (FC-MUX) 205 that multiplexes the buffered video/audio data for transmission via the downstream high speed forward channel.

If there is an upstream port, the forward channel demultiplexer (FC-DMX) 201 sends received control data to a local control processor 213. Recall this processor 213 can be implemented within control data processing section 105, if so desired. Alternatively, processor 213 can be implemented as a distinct control module as shown in FIG. 2a. Note that processor 213 can be included in the ASMI 107 architecture, or otherwise communicatively coupled with the ASMI 107. The FC-DMX 201 also temporarily buffers received video/audio data in an elastic buffer called relay buffer 203. The FC-MUX 205 also multiplexes the video/audio data from that relay buffer 203 for transmission via the downstream high speed forward channel. The two elastic buffers 203 and 211 (e.g., FIFO buffers) are used to buffer respective stream data while the other stream is being transmitted.

The ASMI 107 also has a backward channel demultiplexer (BC-DMX) 209 that demultiplexes control data received via the downstream backward channel, so that data can then be provided to the local control processor 213. The control data from the upstream high speed forward channel (extracted by the FC-DMX 201) and from the downstream low speed backward channel (extracted by the BC_DMX 209) are sent to the local control processor 213 for processing. The control processor 213 also transmits the control data to the downstream device via the FC_MUX 205, and to the upstream device (if there is one) via a backward channel multiplexer (BC-MUX) 207, which multiplexes the control data for transmission via the upstream backward channel.

Communication between the local control processor 213 (and/or the control data processing section 105) and the ASMI 107 can be carried out using conventional technology, such as USB, Ethernet, or universal asynchronous receiver transmitter (UART).

ASMI for Sink Device

Figure 2B:
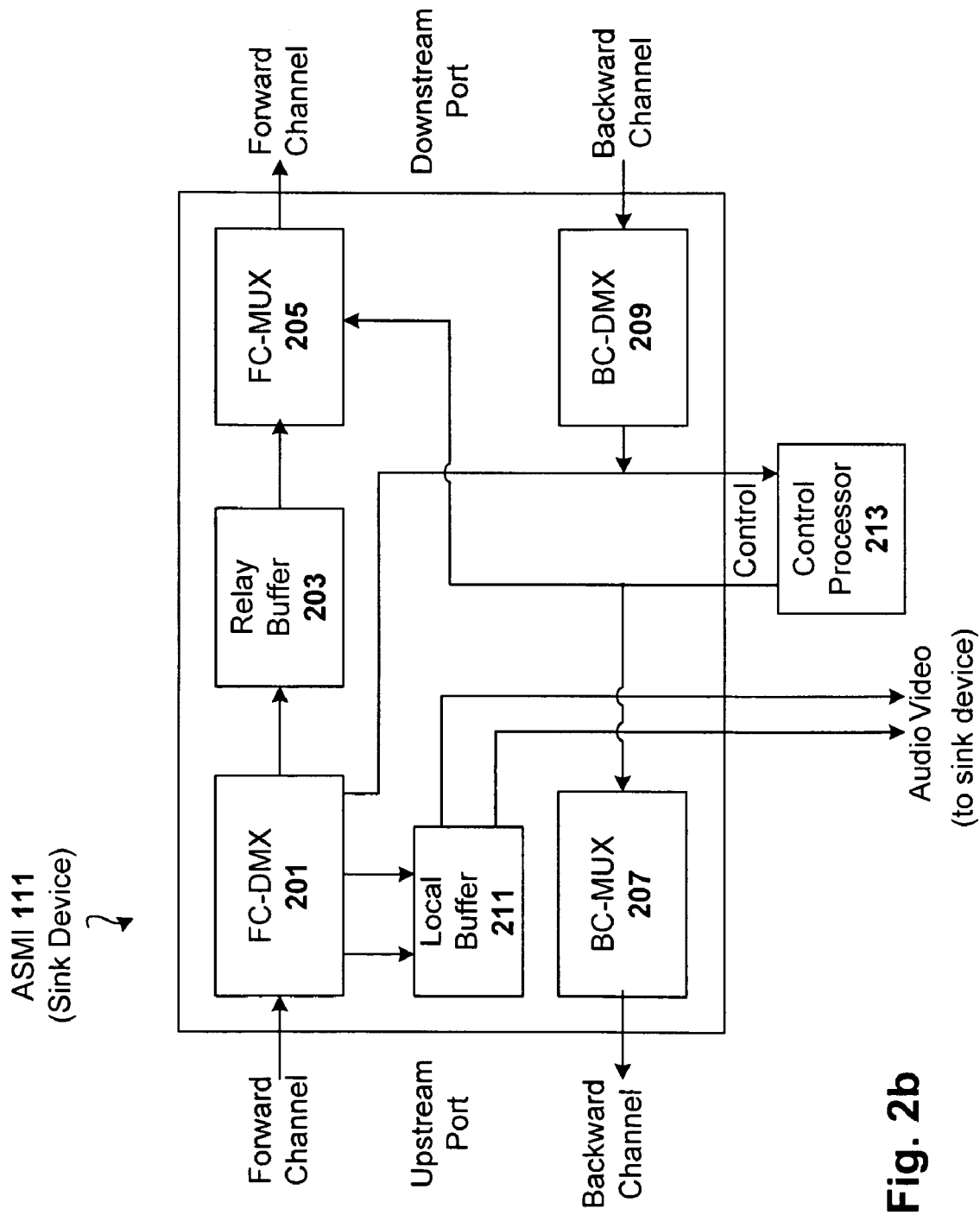
FIG. 2b is a block diagram of an ASMI for the sink device of FIG. 1, configured in accordance with an embodiment of the present invention.

FIG. 2b is a block diagram of an ASMI 111 for the sink device of FIG. 1, configured in accordance with an embodiment of the present invention. As previously explained, ASMI 111 can exist independently of the sink device in other embodiments, if so desired.

This example ASMI 111 has an upstream port and an optional downstream port. The upstream port includes a high speed forward channel receiving port and a low speed backward channel transmission port. The optional downstream port, which includes a low speed backward channel receiving port and a high speed forward channel transmission port, can provide video/audio signals to a downstream sink device in a daisy-chain configuration, as will be discussed in turn.

In operation, the ASMI 111 receives video, audio, and control data from the high speed forward channel receiving port. The FC-DMX 201 sends received control data to a local control processor 213. Recall this processor 213 can be implemented within control data processing section 115, if so desired. Alternatively, processor 213 can be implemented as a distinct control module as shown in FIG. 2b. Note that processor 213 can be included in the ASMI 111 architecture, or otherwise communicatively coupled with the ASMI 111. The video and audio data is saved into the local buffer 211, in preparation for display (e.g., by operation of video/audio processing section 113, such as that included in a digital TV or other such sink device). If the received video and audio data is not destined for the local display device, the FC-DMX 201 writes that data into the relay buffer 203. The FC-MUX 205 multiplexes the video/audio data from that relay buffer 203 for transmission via the downstream high speed forward channel. The two elastic buffers 203 and 211 (e.g., FIFO buffers) are used to buffer respective stream data while the other stream is being transmitted.

The control data from the upstream high speed forward channel (extracted by the FC-DMX 201) and from the downstream low speed backward channel (extracted by the BC-DMX 209) are sent to the local control processor 213 for processing. The control processor 213 also transmits the control data to the downstream device (if there is one) via the FC-MUX 205, and to the upstream device via a BC-MUX 207, which multiplexes the control data for transmission via the upstream backward channel. Note that the processing of control information can be implemented the same way as that of source device.

Communication between the local control processor 213 (and/or the control data processing section 115) and the ASMI 111 can be carried out using conventional technology, such as USB, Ethernet, or universal asynchronous receiver transmitter (UART).

Each of FC-MUX 205 and BC-MUX 207 can be programmed or otherwise configured to provide simple multiplexing. Likewise, each of FC-DMX 201 and BC-DMX 209 can be programmed or otherwise configured to provide complementary demultiplexing. In one particular embodiment, the multiplexers are implemented as a multiplex state machine, and the demultiplexers are implemented as a demultiplex state machine. Each of these MUX/DMX state machines will be discussed in turn. Other techniques for serializing data for transmission, and then deserializing that data for receiver processing can be used here, as will be apparent in light of this disclosure.

Automatic/Dynamic Addressing Assignment

As previously discussed, the multimedia system can be configured with an automatic and dynamic addressing assignment scheme that allows a user to rewire source and/or sink device cables, wherein all addressing for all networked devices automatically updates to maintain reliable communication. In more detail, each source and sink device is assigned with an address. This will allow control information to be passed among all source devices and sink devices.

The address assignment mechanism in accordance with one embodiment of the present invention is designed to satisfy the following requirements: (1) the assignment is fully automatic, so no switch and other user interface is needed; (2) the assignment is dynamic, such that the address is updated to reflect any network cabling change by the user; and (3) the address and its assignment scheme are transparent to the user. The address is based on the position and ordering of each device in the daisy-chain connection.

In one particular embodiment, the address assignment mechanism is implemented using the forward channel data format. In particular, the forward channel format includes a field (e.g., one byte) called upstream device address. In one such case, the address has the following 8 bit format:

| Bit 7 | Bit 6 | Bit 5:0 |
|---|---|---|
| Source Bit | Sink Bit | Position |

Source Bit: 1: The device has video/audio source
0: The device does not have video/audio source
Sink Bit: 1: The device can display video/audio
0: The device can not display video/audio
Position: This six bit address is derived from the device position in the daisy chain. If there is no upstream port detected, the address shall be assigned as one. For any one downstream device in the chain, if the upstream device has an position portion of the address of i, then that one position portion of the downstream device address shall be assigned as i+1.

This upstream device address field makes it possible for the downstream device to update its address whenever the user changes the cable configuration. For example, if the upstream port address received by a downstream device has changed (e.g., because the user has added a new piece of equipment, such as a second DVD player), then the local address assignment for that downstream device is updated so that its address is one plus the address of the received upstream port address. Detecting a change in upstream port address can be carried out, for example, by the control processor 213 (or other local computing function). The control processor 213 can then compute the new address for the device.

Point-to-Point Configuration

Figure 3A:
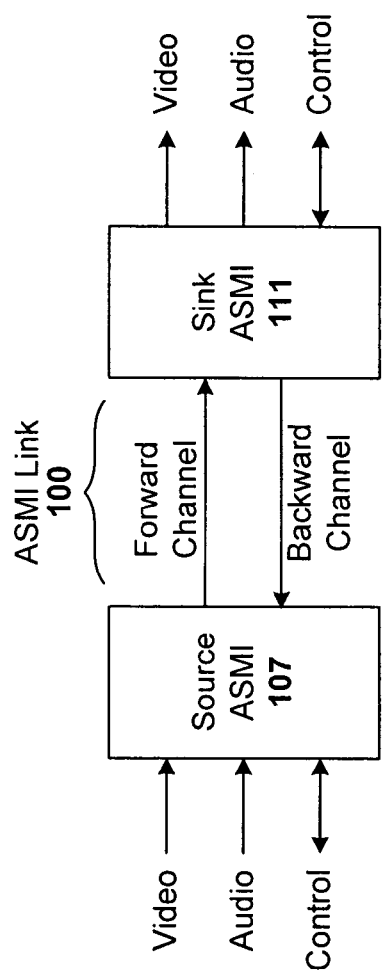
FIG. 3a is a block diagram of an uncompressed multimedia data communication system configured in a point-to-point connection scheme, in accordance with an embodiment of the present invention.

FIG. 3a is a block diagram of an uncompressed multimedia data communication system configured in a point-to-point connection scheme, in accordance with an embodiment of the present invention.

As can be seen, the sink ASMI 111 is connected to the source ASMI 107 via the ASMI link 100. The ASMI 107 receives multimedia data (video/audio) from a source device (e.g., DVD player that includes video/audio processing section 103 and control data processing section 105 with integrated control processor 213), multiplexes that multimedia data and control data into a serial data stream, and transmits that data stream to the sink ASMI 111 via its downstream port and the ASMI link 100. The sink ASMI 111 receives the serial data stream at its upstream port, and demultiplexes it into separate video/audio streams for display/sounding and control data processing by the sink device (e.g., digital TV that includes video/audio processing section 113 and control data processing section 115 with integrated control processor 213). The previous discussions with reference to FIGS. 1, 2a, and 2b are equally applicable here.

In this example configuration, external video circuitry is used. However, it will be appreciated in light of this disclosure that the ASMI 107 can be integrated into a source device and ASMI 111 can be integrated into a sink device (as shown in FIG. 1, for example).

Daisy-Chain Configuration

Figure 3B:
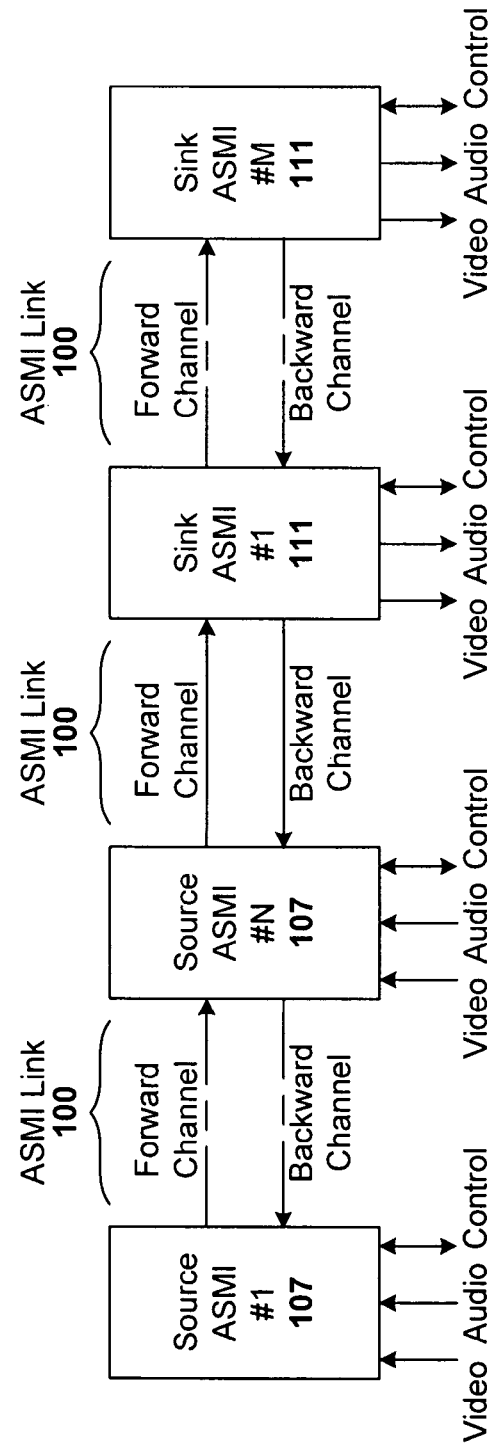
FIG. 3b is a block diagram of an uncompressed multimedia data communication system configured in a daisy-chain connection scheme, in accordance with an embodiment of the present invention.

FIG. 3b is a block diagram of an uncompressed multimedia data communication system configured in a daisy-chain connection scheme, in accordance with an embodiment of the present invention. This system configuration allows a user to connect several source devices and/or sink devices to form one network. In this particular embodiment, there are N source ASMIs 107 (for N corresponding source devices) and M sink ASMIs 111 (for M corresponding sink devices), where N is not necessarily equal to M, but can be. Under proper control, each of the M sink devices can display video/audio data from each of the N source devices. The source ASMIs 107 and/or sink ASMIs 111 are able to pass high speed multimedia data from the upstream device to the downstream device.

As can be seen, each ASMI 107 and 111 in the daisy-chain receives control data from at least one of two sources: from the upstream device via its high speed forward channel receive port, and from the downstream device via its low speed backward channel receive port. The source ASMI #1 does not have an upstream device, and the sink ASMI #M does not have a downstream device. All the control data received at anyone ASMI is sent to the local processor (e.g., control processor 213) for processing, and is not relayed to the downstream device directly. If the control data traffic is not targeted to the local device, the local control processor 213 will transmit that traffic to other devices via either the backward channel or the control data field in the forward channel data stream, which will be discussed in turn.

In addition, each ASMI 107 and 111 transmits control data to at least one of two places: to the downstream device via its high speed forward channel transmit port, and to the upstream device via its low speed backward channel transmit port. The addressing and processing of the control data is the responsibility of the local control processor 213 and its associated protocols (which may be proprietary or conventional). The ASMI mechanism described in this example system design passes the control data to and from the local processor, and transmits it via the high speed forward channel and low speed backward channel.

In a multi-source, multi-sink configuration, there is typically more than one multimedia stream. In order to support this operation, a stream number is used. In more detail, and in accordance with one particular embodiment, each multimedia data stream in the forward channel of the ASMI link 100 has a stream number field. The local control processor 213 of each source device programs or otherwise assigns the stream number. The ASMI 107 of the source device transmits its local multimedia data with this assigned stream number in its header, as will be explained in turn. Similarly, the local control processor 213 of each sink device also programs a stream number. Processor 213 sends any received multimedia data stream including a stream number that matches this local stream number to the local device for display/sounding by operation of the ASMI 111. If the stream number does not match, then processor 213 relays the data stream to the downstream device.

The stream number mechanism facilitates user interface for a stream selection process. In particular, and in accordance with an embodiment of the present invention, each source ASMI 107 transmits with its own address as the stream number. In other words, ASMI #1 will transmit multimedia stream number one, and ASMI #2 will transmit multimedia stream number two, and so on. This can be a default stream number assignment scheme if so desired. Each sink ASMI 111 (e.g., in conjunction with its local control processor 213) will detect the total number of active streams and display them to the user (e.g., via a pull down list or other suitable user interface mechanism). The user can then select the desired video stream by selecting one stream from the displayed list. The user selected stream number can be programmed into one or more ASMIs 111, so that each programmed ASMI 111 will know to deliver stream data having that stream number to the local video/audio circuitry. Any number of known user interface techniques and menu schemes can be used to allow the user to access stream information available from the local control processor 213 of the sink device.

In one particular embodiment, for a source ASMI 107, the local data is first stored in the local buffer 211. If there is an upstream port, the data received from that port is first saved in the relay buffer 203. The merge of the local multimedia data and the data from the upstream device can be implemented, for example, with a simple multiplexing (e.g., FC-MUX 205 and BC-MUX 207), as previously explained with reference to FIGS. 2a and 2b. If the relay buffer 203 is not empty, the FC-MUX 205 will first transmit a whole packet from the relay buffer 203. If the relay buffer 203 is empty, the FC-MUX 205 will transmit a data packet from the local buffer 211. The upstream sink device receives data via its corresponding ASMI 111. The stream number field in the packet is checked (e.g., by operation of the local control processor 213). If the stream number matches its local number, the FC-DMX 201 of the ASMI 111 then writes the data to the local buffer 211 and displays/sounds using the local sink device. Otherwise, the FC-DMX 201 writes the data into its relay buffer 203 and relays that data to its downstream port in the same way as the ASMI 107 does (by way of FC-MUX 205).

Just as with the example configuration shown in FIG. 3a, this example daisy chain configuration employs external video circuitry. However, it will be appreciated in light of this disclosure that each of the ASMIs 107 can be integrated into a corresponding source device and each ASMI 111 can be integrated into a corresponding sink device. In general, any combination of source and sink circuitry can be used, whether external to or integrated with ASMI 107 or 111 circuitry.

The uncompressed video/audio is constant bit rate in nature. Assume the available bandwidth for the ASMI link 100 and architecture is greater than or equal to the desired total multimedia data rate.

Media Center Configuration

Figure 3C:
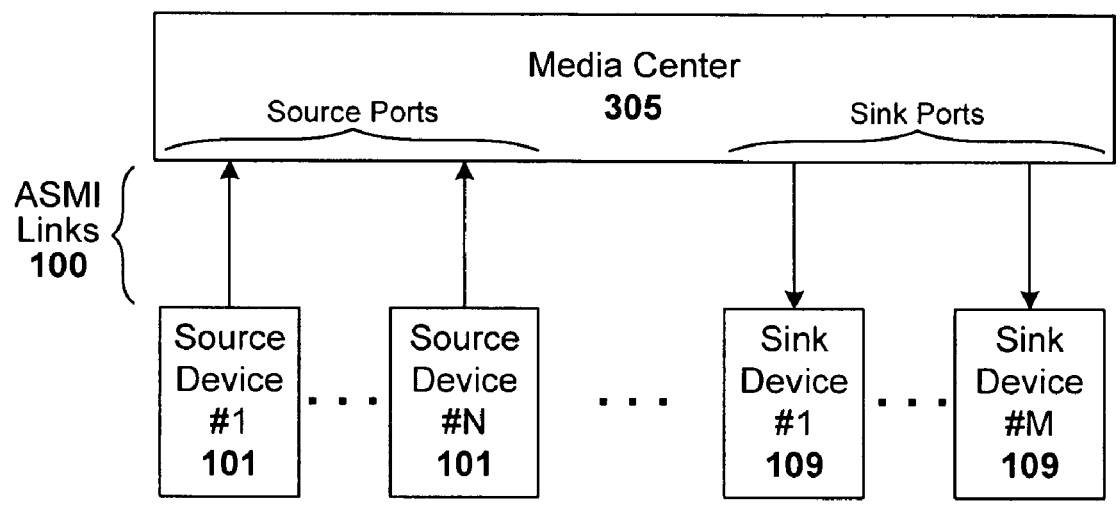
FIG. 3c is a block diagram of an uncompressed multimedia data communication system configured with a media center, in accordance with an embodiment of the present invention.

FIG. 3c is a block diagram of an uncompressed multimedia data communication system configured with a media center, in accordance with an embodiment of the present invention.

In this configuration, there is a device called media center 305. It has one or more source ports and one or more sink ports, each configured with an ASMI as discussed with reference to FIGS. 2a and 2b, respectively. A control processor 203 can be used as the local processor in the media center 305. Each port (or a sub-set of available ports) interfaces with a source device 101 or sink device 109 in the same way as that in point-to-point topologies (as described with reference to FIG. 3a). There are N source devices 101 and M sink devices 109. Note that M can be equal to N, but need not be.

The source ports of the media center 305 receive multimedia data from a corresponding source device 101 via an ASMI link 100. The ASMI 111 for that port of the media center 305 effectively operates as a forwarding state machine, by forwarding the received data to the proper sink port. In one particular embodiment, the ASMI 111 operates under the control of the control processor 213 of the media center 305. This processor can be further configured to interpret a user's selection or input (e.g., remote control or TV menu selections), using conventional or custom processor software algorithms and protocols.

Data Format

In one example embodiment, the multimedia and control data in the ASMI link 100 is transmitted in packets. Each packet covers a fixed number of video pixel clocks. The packet rate on the serial interface is: Pixel clock rate/Packet size (in pixels). Based on this fixed packet size scheme, the receive-side can readily regenerate all the multimedia data and control signals.

Serial Clock Interface

The clock rate for the high speed forward channel of the ASMI link 100 is normally independent of the video clock rate. There may be more than one video/audio source, each with different clocks. Even for one video stream, the video clock can still be different for different video modes (e.g., 480p, 720p, 1080i, etc). In one particular embodiment, the high speed forward channel of the ASMI link 100 runs at a constant clock. The source device (or first source device in the daisy-chain configuration) generates this clock. All downstream devices recover this clock and use it for ASMI operation, including traffic receiving and relaying. In one embodiment, the control processor 213 (or a dedicated module included in ASMI circuit 111) is programmed or otherwise configured to implement known clock recovery techniques.

Multiple Streams

As previously discussed, a multimedia system can be designed to support multiple video/audio streams, in accordance with an embodiment of the present invention. This is useful, for example, for multi-source and/or multi-sink configurations, and for picture in picture applications. In one particular embodiment, there is an 8 bit stream number in the header of each multimedia (e.g., video/audio) data packet to indicate to which multimedia stream this packet belongs. Based on a user's stream selection, the control processor 213 programs a target stream number in the ASMI 111 of each sink device. In addition, each ASMI 107 will transmit all multimedia data from its source device with its corresponding stream number. The downstream sink device will compare the received stream number with its programmed stream number. If the two match, the stream is delivered to the local video circuit (e.g., video/audio processing section 113, such as that in a digital TV) for display/sounding. Otherwise, the packet is relayed to the next down stream port for like processing, until it is received at its intended destination.

Time Stamp Scheme

Videos are displayed in pixels, lines, and frames. Uncompressed video/audio data must be exactly synchronized with timing control signals like HSYNC (Horizontal Synchronization) and VSYNC (Vertical synchronization). In an HDMI/DVI system, there are also CTL control signals to synchronize HDCP and digital audio application. These timing control signals change their state at a specific pixel clock. The status of the signals and the time they are changing are carried over the high speed ASMI link 100 for the sink device to recreate the original video/audio.

In one particular embodiment of the present invention, each of the source devices includes or is otherwise operatively coupled to a circuit configured to record all the control signal changes (e.g., such as a dedicated circuit, control processor 213, or a microcontroller with I/O ports for receiving control signals and port routines to log signal changes). After each signal change, the new control signal values and the relative time at which the change takes place are recorded. This recorded timing data are generally referred to as time stamps. In one such case, all the time stamps are relative to the first pixel time of the packet (or some other consistent time stamp point). In addition, all the time stamps and timing control signal values are transmitted to the sink device together with the multimedia data.

At the sink side, the video regeneration circuit (e.g., video/audio processing section 113, such as that in a digital TV) starts pixel counting from the first pixel for each packet data. When the count reaches each time stamp, the control signals are generated according to the value in the packet. In this way, all the control timing signals are regenerated at exactly the same time as they are recorded at the source side. Note that the number of time stamps per packet time is not constant. Thus, a counter can be used to count the number of time stamps for each packet. In one such embodiment, this counter is transmitted from the source device ASMI 107 to the sink device ASMI 111, together with all the time stamps.

Blank Suppression Scheme

Typical video data includes active video pixels and about 15%-20% blank pixels. These blank pixels do not carry useful information and consume valuable bandwidth if being carried over a constrained link. As described in U.S. patent application Ser. No. 10/864,755, these blank pixels can be suppressed to save serial link bandwidth. In such an embodiment, the ASMI link will transmit active pixel data only. Application Ser. No. 10/864,755, filed on Jun. 8, 2004, and titled "Scheme For Transmitting Video and Audio Data of Variable Formats Over a Serial Link of a Fixed Data Rate," is herein incorporated in its entirety by reference. In one such embodiment, the user can select to enable/disable blank pixel suppression for their particular multimedia communication system.

Forward Channel Data Format

In one embodiment of the present invention, the forward channel data transmitted on the ASMI link 100 is in the form of packets. One packet carries the active video data for the pre-specified number of video clocks. All fields in this example format are in the byte boundary, except the number of audio words header field and the number of audio channels header field, which can be combined into one byte. This facilitates transmitting the data using a standard serialize/deserialize (SerDes) interface and with a standard 8B/10B encoding scheme.

Each forward channel packet has the following format shown in Table 1, in accordance with one particular embodiment:

TABLE 1

| | Field | Number of Bytes |
|---|---|---|
| Headers | Packet Sequence Number | 1 |
| | Video Stream Number | 1 |
| | Number of Audio Words | ½ |
| | Number of Audio channels | ½ |
| | Video Mode | 1 |
| | Number of Active Video Words | 2 |
| | Number of Video Time Stamps | 1 |
| Control Words | Upstream Device Address | 1 |
| | Control Data | 12 |
| Time Stamps | Time Stamps 1 | 3 |
| | Time Stamps 2 | 3 |
| | Time Stamps n | 3 |
| Audio | Up to Four Channel of Audio Data | Variable |
| Video | Active Video Pixel Data | Variable |

The Packet Sequence Number is used for each device to synchronize with each other. It is incremented by one for each packet transmitted at the source. The number is wrapped back to zero when its maximum value is reached. Each downstream device should see a constantly incrementing number for this field if no packet is lost.

Video Stream Number is used for multi-video stream modes. It indicates to which video stream this packet belongs. Each device is programmed with a local steam number by the local control processor 213. The default value of this field is the same as the device address. The source device will use this number to transmit its multimedia data streams. The sink device will compare this field with its locally programmed number.

Number of Audio Words indicates the number of audio words transmitted in this packet. Since the audio circuit and video circuit may not share the same clock, the number of audio words generated during one video packet time is not constant. Source devices set this field and the sink devices use this field to demultiplex the correct number of audio words from the stream.

Number of Audio Channels indicates the number of audio channels transmitted in this packet. Data for each audio channel is transmitted sequentially until all the channels are transmitted.

Video Mode indicates the video mode being transmitted by this packet (e.g., 480p, 720p, 1080i, etc).

Number of Active Video Words indicates the number of active video words transmitted by this packet. Since only the active video data is being transmitted (in one particular embodiment), the number of active video data determines the packet size. The difference between Number of Video Words and Number of Active Video Words is the number of video clocks in the blank period.

As described previously, the Upstream Device Address field specifies the address of the upstream device and can be used for automatic address learning and multi video stream application.

Control Word is used to carry general purpose control data. This can be, for example, HDCP related control information, remote control information, home entertainment control information, Internet related information, and other such control information, as needed. Control words are used to exchange data among the control processors 213 in each device. In the forward channel of the ASMI link 100, and according to one particular embodiment of the present invention, a control word has the following format shown in Table 2:

TABLE 2

| Bytes | Content |
| --- | --- |
| 1 | Source Address |
| 2 | Destination Address |
| 3 | Header |
| 4 | Data Byte 1 (payload) |
| 5 | Data Byte 2 (payload) |
| 6 | Data Byte 3 (payload) |
| 7 | Data Byte 4 (payload) |
| 8 | Data Byte 5 (payload) |
| 9 | Data Byte 6 (payload) |
| 10 | Data Byte 7 (payload) |
| 11 | Data Byte 8 (payload) |
| 12 | CRC |

In one particular embodiment, the control processor 213 in each source or sink device performs segmentation and re-assembly functions and transmits data by this eight byte payload field. Either in point-to-point or daisy-chain configuration, the whole received control word is passed to the local control processor 213 for interrogation. In the same way, the local control processor 213 will generate all the control data traffic for the downstream device.

Audio Word has variable length and carries all the audio data. The length of this field is determined by the number of audio channels and the number of audio words fields. At the beginning of the audio word field, a four bit audio mode is first transmitted.

1: I2S
2: SPDIF
Others: Reserved for future expansion

The audio clock count field is used for the sink device's audio PLL to regenerate the original audio clock. This field indicates the number of audio clocks counted during the past packet time. In one particular embodiment of the present invention, the audio words are transmitted in the following order shown in Table 3:

TABLE 3

| |
| --- |
| Audio Mode: 4 bit |
| Audio Clock Count: 12 bit |
| Audio Word 1: Channel 1 |
| Audio Word 1: Channel 2 |
| Audio Word 1: Channel 3 |
| Audio Word 1: Channel n |
| Audio Word 2: Channel 1 |
| Audio Word 2: Channel 2 |
| Audio Word 2: Channel 3 |
| Audio Word 2: Channel n |
| Audio Word m: Channel 1 |
| Audio Word m: Channel 2 |
| Audio Word m: Channel 3 |
| Audio Word m: Channel n |

Video Word has variable length and carries all the video data. The length of this field is determined by the number of active video words. Although the number of video pixel clocks during one packet time is constant, the number of active pixels is variable since there is blank pixel time. Note that the ASMI does not interpret or alter the video data content. It simply passes the data in the same order from source to sink devices. The video word field sequentially carries all the video data from the source device to the sink device. For a typical 24 bit video (standard HDMI/DVI interface and most video devices today), every pixel of video is carried by three bytes of high speed serial data.

For higher resolution (e.g., 30 bit) video, the number of bits for each video pixel may not be a multiple of bytes. The video word field still sequentially carries all the video data from the source device to the sink device. The following scheme can be used, in accordance with one embodiment of the present invention for 30 bit video transmission: Each pixel of video shall be carried by four bytes of high speed serial data. Although this transmission scheme can cause the waste of 2/32=6% of bandwidth, it simplifies the data alignment and circuit design. Thus, a trade-off between wasted bandwidth and simplified alignment/circuit design can be considered when implementing a given application.

Backward Channel Data Format

The data format for the backward channel will now be described, in accordance with one embodiment of the present invention. In one particular embodiment of the present invention, the backward channel data has a similar format as the control data in the forward channel.

In one such case, the backward channel packet has a Preamble field and a Start Frame Delimiter (SFD), as in a typical communication network. A Packet Size field can also be provided, so as to enable a variable packet size, if so desired. In one particular implementation, the Source Address and Destination Address have the same meaning as that of the forward channel control data. The control data can also have variable size (up to 256 bytes in this example). In one particular embodiment, a CRC field having a two byte length is also provided. An example backward channel packet is shown in Table 4:

TABLE 4

| | Field | Number of Bytes |
|---|---|---|
| Header | Preamble | 2 |
| | SFD | 1 |
| | Packet Size | 1 |
| | Packet Type | 1 |
| | Source Address | 1 |
| | Destination Address | 1 |
| | Control Data | Up to 256 |
| | CRC | 2 |

In one particular embodiment of the present invention, each ASMI has a state machine for demultiplexing (e.g., FC-DMX 201 and BC-DMX 209) the incoming data, and a state machine for multiplexing (e.g., FC-MUX 205 and BC-MUX 207) the outgoing data. In one such embodiment, the demultiplexing state machine receives data from the upstream ASMI and separates the data into three data streams (video, audio, and control). The multimedia data (video and audio) with a video stream number that matches or otherwise corresponds to the sink device is stored in the local buffer 211 for display/sounding. The multimedia data with a non-matching video stream number is stored in relay buffer 203 for relaying to the downstream port. The control data is transferred to the local control processor 213, as previously explained. All these separations can be performed by the demultiplexing state machine based on the predefined packet format discussed herein.

The multiplexing state machine receives multimedia data (video and audio) from the local video/audio circuit (e.g., DVD player etc.) via the local buffer 211, and takes relayed upstream multimedia data from the relay buffer 203 if there is any, as well as the control data from the local control processor 213. The multiplexing state machine then multiplexes all the data and transmits that data to the downstream ASMI via the ASMI link 100.

Multiplexing State Machine

The following pseudo code illustrates the multiplexing state machine, in accordance with one embodiment of the present invention:

```
State Idle:
    If (Relay_Buffer Non empty)
        Set Flag: Relay_up_stream_port
        Transmit Sequence Number
        Increment Sequence Number
        Go to State Transmit_Header
    Else if (Local Video data Ready)
        Set Flag: Transmit_Local_Video
        Transmit Sequence Number
        Increment Sequence Number
        Go to State Transmit_Header
    Else
        Go to State Idle
State Transmit_Header:
    If (Relay_up_stream_port)
        Relay header from Relay_Buffer to downstream port
        Go to State Transmit_Control_Data
    Else if (Transmit_Local_Video)
        Transmit number of audio word and number of audio channel
        Transmit video stream number
        Transmit video mode
        Transmit number of active video word
        Transmit number of video time stamps
        Go to State Transmit_Control_Data
State Transmit_Control_Data:
    Transmit upstream device address
    Transmit General Purpose Control Data from local processor
    Go to State Transmit_Time_Stamps
State Transmit_Time_Stamps:
    If (Relay_up_stream_port)
        Relay all video time stamps from the Relay_Buffer
        Go to State Transmit_Audio_Data
    Else if (Transmit_Local_Video)
        Transmit all video time stamps (specified by number of time
            stamps) from local video device
        Go to State Transmit_Audio_Data
State Transmit_Audio_Data:
    If (Relay_up_stream_port)
        Relay all Audio Data from the Relay_Buffer
        Go to State Transmit_Video_Data
    Else if (Transmit_Local_Video)
        Transmit audio data (specified by number of audio word)
            from local device
        Go to State Transmit_Video_Data
State Transmit_Video_Data:
    If (Relay_up_stream_port)
        Relay all Video Data from the upstream port
        Go to State Idle
    Else if (Transmit_Local_Video)
        Transmit all video data (specified by number of active Video Data)
            from local video device
        Go to State Idle
```

Demultiplexing State Machine

The following pseudo code illustrates the demultiplexing state machine, in accordance with one embodiment of the present invention:

```
State Idle:
    If (Upstream_ASMI_Packet_Detected)
        Go to State Receive_Sequence_Number
    Else
        Go to State Idle
State Receive_Sequence Number
    Record packet sequence number
    Go to State Receive_Stream_Number
State Receiver_Stream_Number:
    If (Stream_number matches local sink device address)
        Set Local stream flag
        Go to State Receive_Header
    Else
        Clear Local stream flag
        Go to State Receive_Header
State Receive_Header:
    If (Local Stream)
        Store header to local_buffer
        Go to State Receive_control_word
    Else
        Store header to relay_buffer
        Go to State Receive_control_word
State Receive_control_word:
    Transfer general purpose control word to local processor
    Go to State Receiver_Audio_Data
State Receive_Audio_Data:
    If (Local Stream)
        Transmit audio data (specified by number of audio word)
            to local device
        Go to State Receive_Video_Data
    Else if (Transmit_Local_Video)
        Relay all audio Data (specified by number of audio word)
            to relay_buffer
        Go to State Receive_Video_Data
State Receive_Video_Data:
    If (Local Stream)
        Transmit video (specified by number of active Video Data)
            to local_buffer and local video device
        Go to State Idle
    Else if (Transmit_Local_Video)
        Relay all Video Data from the upstream port to the relay_buffer
        Go to State Idle
```

HDCP Over ASMI

HDCP (High Definition Content Protection) is a protocol developed for the HDMI and DVI interface to carry protected video/audio signals. One embodiment of the present invention can be used to implement the HDCP protocol over the ASMI link 100. The employed communication schemes are based on HDCP specification. All the key vectors and key exchange schemes are the same as HDCP. The generation and application of the encryption polynomials are the same as that in the standard HDCP protocol.

Data transmitted over the forward channel serial link are encrypted. In the source device, the data is encrypted at the parallel bus before the SerDes. In the sink side, the data is decrypted at the parallel bus of the SerDes output. In a typical HDMI or DVI based HDCP system, the source device periodically (about every two seconds) reads link verification value Ri' from the sink device. The link verification fails if the Ri' value is wrong.

If the data is carried over an optical wireless link for the forward channel, the backward channel can be implemented with an RF wireless link (e.g., 802.11 or other suitable RF wireless link technology). A typical wireless link has more noise and more transmission errors. However, there are techniques that can be used to improve the reliability of the HDCP link verification in the noise environment. One technique is more retransmission. In particular, the link verification value Ri' can be sent from sink to source every millisecond (or so), continuously. A few corrupted values will be detected and not cause any problem. Another technique is where the source side can compare the received value with its newly generated value and previous value. Either match indicates a valid HDCP verification. With this technique, any delay of the new Ri' caused by network latency or re-try latency will not cause HDCP verification failure.

For the sink side to decrypt the data correctly, the sink and source device must be in exact synchronization for all packets and all data words. Packet data format for the ASMI as described herein provides an easy way for this synchronization. In particular, each packet header contains a packet sequence number. Sink and source devices can use this sequence number to get synchronized with each other. All the key exchange, key update, polynomial generation, data encryption and decryption are all synchronized with this sequence number.

EDID Pass Through Via Serial Link Backward Channel

As is known, each sink device has certain display characteristics and capabilities, which are specified in a data structure called EDID (Extended Display Identification Data) or E-EDID (Enhanced Extended Display Identification Data). This data (EDID and E-EDID) is generally referred to herein as EDID data. In one particular embodiment of the present invention, this information is made available to the source device so it can adjust its output to match the targeted sink device's capability. In a traditional configuration, a DVI/HDMI cable is used to connect the video sink and video source. The two wire DDC channel (SCL and SDA) is used by the video source device to read the EDID data from sink device. Hot Plug Detect (HPD) is a signal to indicate that a cable between the video sink and source has been connected and the video sink is turned on.

Figure 4A:
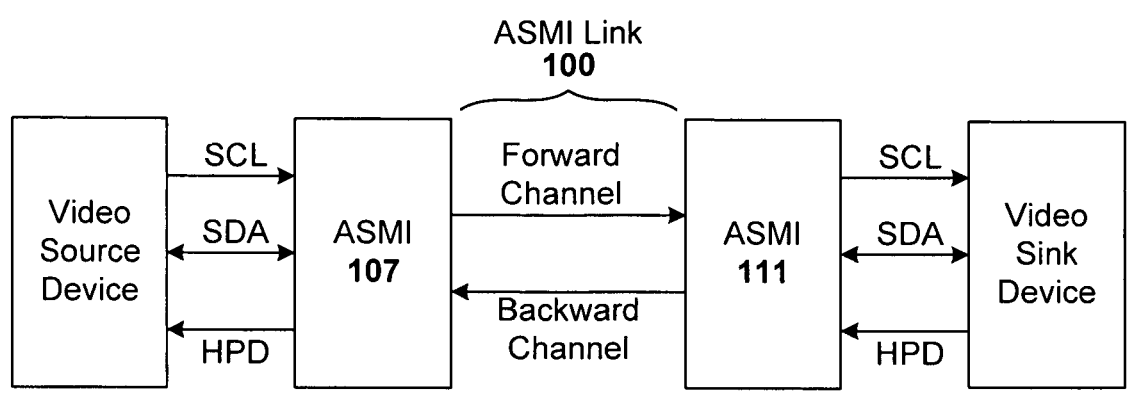
FIG. 4a is a block diagram of an uncompressed multimedia data communication system configured for EDID pass through, in accordance with an embodiment of the present invention.

FIG. 4a is a block diagram of an uncompressed multimedia data communication system configured for EDID data pass through, in accordance with an embodiment of the present invention. As can be seen, the link between the source device and sink device is implemented with an ASMI scheme as described herein (e.g., a high speed forward channel and low speed backward channel). There is no physical copper wire between the two ASMI 107 and 111. The ASMI 107 can be connected to the video source device, for example, via a standard HDMI/DVI interface. The ASMI 111 device can be similarly connected to the video sink device. Recall that ASMI device 107 and/or ASMI device 111 can be integrated into their corresponding video source and sink devices, if so desired. The ASMI 107 and ASMI 111 are communicatively coupled by ASMI link 100.

Figure 4B:
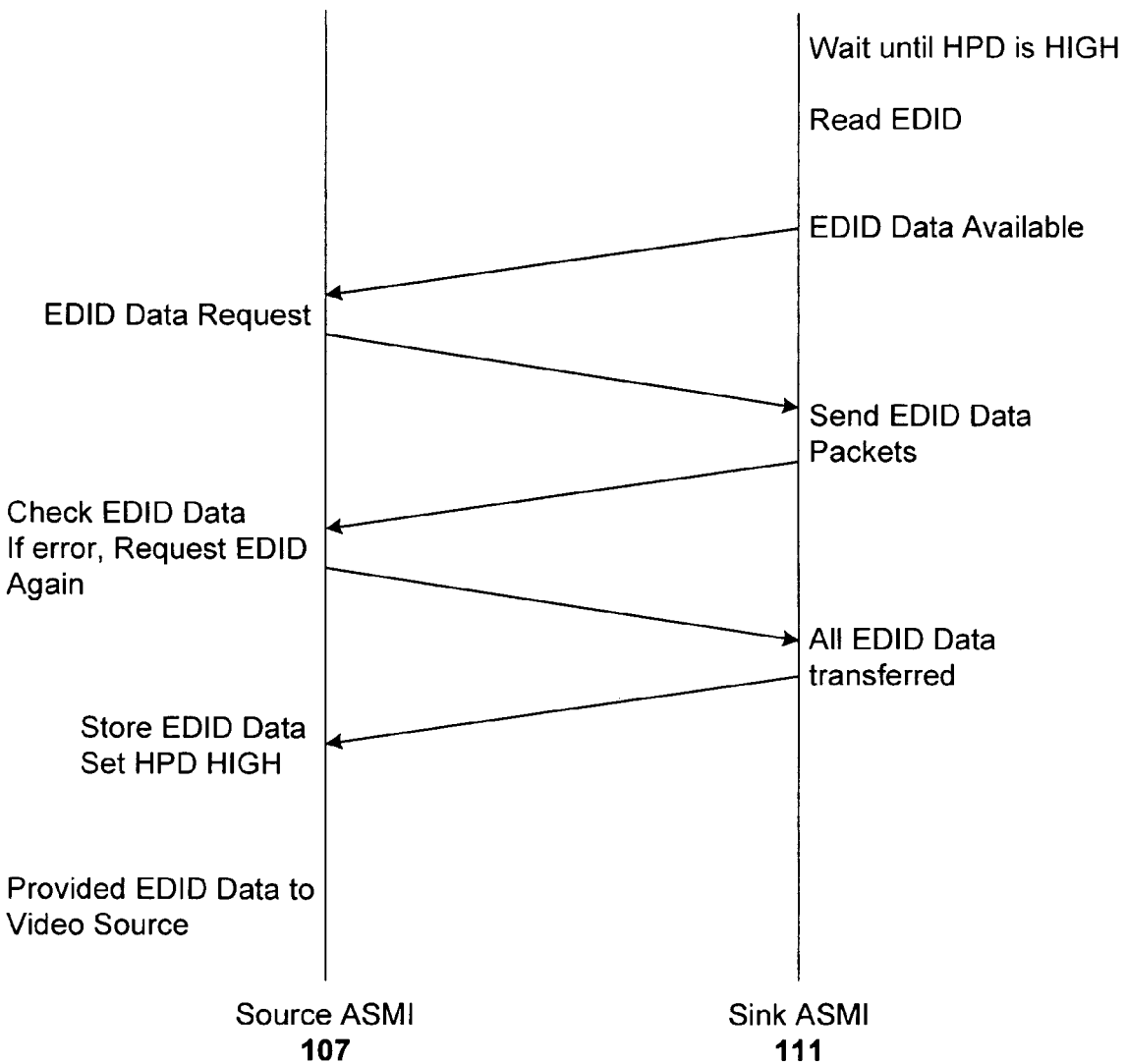
FIG. 4b is a diagram of an EDID pass through scheme configured in accordance with an embodiment of the present invention.

With reference to the configuration shown in FIG. 4a, the diagram of FIG. 4b describes the scheme to pass the EDID data from video sink to video source. As can be seen, the ASMI 111 monitors the HPD signal of the video sink device. Once a low to high transition (e.g., over 200 ms) of HPD signal is detected, the ASMI 111 reads the EDID data from the video sink device. This HPD signal monitoring and EDID data reading can be carried out, for example, by a local processor (e.g., processor 213) or dedicated module/circuitry. The transition on the HPD signal can happen any time when, for example, the ASMI 111 is powered on, the video sink device (e.g., DTV) is powered on, and/or an HDMI cable is plugged in (this includes a change of connection from one sink device to another).

Upon successful read of the EDID data from the video sink device, the ASMI 111 device will send an EDID AVAILABLE packet to the ASMI 107 via the backward channel of the ASMI link. The ASMI 107 then sends back a REQUEST packet to the ASMI 111 via the control field in the forward channel to indicate the ASMI 111 can send the available EDID data. Upon receiving the EDID REQUEST packet, the ASMI 111 segments the EDID data and builds up EDID packets and sends all the packets to ASMI 107 via the backward channel of the ASMI link. The packets transmitted by the forward channel and backward channel can be formatted, for example, as previously described. The ASMI 107 then checks all the EDID data. If errors are detected, the ASMI 107 uses the forward channel of the ASMI link to request the EDID data again until all the data is received correctly. This error checking (e.g., CRC or other suitable error checking scheme) can be carried out, for example, by a local processor (e.g., processor 213) or dedicated module/circuitry.

The ASMI 107 will hold its HPD signal LOW to prevent the video source from reading the EDID data until it has successfully received all the EDID data. This is the normal power on procedure. In any other case, if the ASMI 111 detects a low on its HPD input signal, it will pass this low signal to source side, and the source side will assert HPD low immediately. HPD high assertion will be delayed at source side until the successful EDID data reading is complete. Recall that this data can be EDID or E-EDID data. As previously explained, HPD signal management (e.g., detecting, holding, asserting) can be carried out, for example, by a local processor (e.g., processor 213) or dedicated module/circuitry.

The foregoing description of the embodiments of the invention has been presented for the purposes of illustration and description. It is not intended to be exhaustive or to limit the invention to the precise form disclosed. Many modifications and variations are possible in light of this disclosure. For example, multimedia typically includes video and audio data. However, embodiments of the present invention can operate with any type of multimedia data, such as graphics (e.g., digital art or slide shows, with or without audio), audio only (e.g., music or audio books), and video (e.g., movies with or without audio). It is intended that the scope of the invention be limited not by this detailed description, but rather by the claims appended hereto.

What is claimed is:

1. A method for dynamically updating addresses of daisy-chained devices in an uncompressed multimedia communication system, comprising:
   receiving at a downstream device uncompressed multimedia data serially transmitted over a single communication channel from an upstream device, the data in a data format that specifies upstream device address;
   detecting at the downstream device that the address of the upstream device has changed; and
   automatically adjusting the address of the downstream device based on the upstream device address.

2. The method of claim 1 wherein the uncompressed multimedia communication system includes at least a plurality of source devices and a plurality of sink devices.

3. The method of claim 1 wherein the multimedia system is configured for transmission of multiple uncompressed multimedia streams in the single communication channel, and the data format further specifies to which stream each multimedia packet belongs.

4. The method of claim 3 wherein the downstream device is a sink device, the method further comprising:
   comparing at the sink device a received stream number with a programmed stream number associated with the sink device; and
   providing multimedia data having a stream number that matches the programmed stream number to local video/audio processing circuitry.

5. The method of claim 3 wherein the downstream device is a sink device, the method further comprising:
   comparing at the sink device a received stream number with a programmed stream number associated with the sink device; and
   relaying multimedia data having a stream number that does not match the programmed stream number to a next downstream device.

6. The method of claim 3 wherein the downstream device is a sink device, and a programmed stream number is assigned to the sink device by:
   detecting available multimedia streams;
   displaying a list of the available multimedia streams;
   receiving a user stream selection; and
   assigning the programmed stream number to the sink device based on the user stream selection.

7. The method of claim 1 wherein the data format further specifies timing information between a source device and a sink device, the method further comprising:
   receiving at the sink device control signal change data including control signal values and time at which each change occurs relative to a first pixel time of each packet received;
   counting pixels from first pixel for each data packet received; and
   regenerating control timing signal for each packet based on pixel count.

8. The method of claim 1 wherein the data format further specifies timing information between a source device and a sink device, the method further comprising:
   detecting at the source device control signal change data;
   counting pixels from first pixel for each data packet received;
   recording control signal change data including control signal values and time at which each change occurs relative to a first pixel time of each packet received; and
   forwarding the control signal change data to the sink device.

9. An uncompressed multimedia communication system for dynamically updating addresses of daisy-chained devices, comprising:
   an interface for receiving at a downstream device uncompressed multimedia data serially transmitted over a single communication channel from an upstream device, the data in a data format that specifies upstream device address; and
   a control processor for detecting at the downstream device that the address of the upstream device has changed, and for automatically adjusting the address of the downstream device based on the upstream device address.

10. The system of claim 9 wherein the uncompressed multimedia communication system includes at least a plurality of source devices and a plurality of sink devices.

11. The system of claim 9 wherein the multimedia system is configured for transmission of multiple uncompressed multimedia streams in the single communication channel, and the data format further specifies to which stream each multimedia packet belongs.

12. The system of claim 11 wherein the downstream device is a sink device and the control processor is further configured for comparing at the sink device a received stream number with a programmed stream number associated with the sink device, and for providing multimedia data having a stream number that matches the programmed stream number to local video/audio processing circuitry.

13. The system of claim 11 wherein the downstream device is a sink device and the control processor is further configured for comparing at the sink device a received stream number with a programmed stream number associated with the sink device, and for relaying multimedia data having a stream number that does not match the programmed stream number to a next downstream device.

14. The system of claim 11 wherein the downstream device is a sink device, and a programmed stream number is assigned by the control processor to the sink device, the control processor further configured for detecting available multimedia streams, providing a list of the available multimedia streams for display, receiving a user stream selection, and assigning the programmed stream number to the sink device based on the user stream selection.

15. The system of claim 9 wherein the data format further specifies timing information between a source device and a sink device, and the control processor is further configured for receiving at the sink device control signal change data including control signal values and time at which each change occurs relative to a first pixel time of each packet received, counting pixels from first pixel for each data packet received, and regenerating control timing signal for each packet based on pixel count.

16. The system of claim 9 wherein the data format further specifies timing information between a source device and a sink device, and the control processor is further configured for detecting at the source device control signal change data, counting pixels from first pixel for each data packet received, recording control signal change data including control signal values and time at which each change occurs relative to a first pixel time of each packet received, and forwarding the control signal change data to the sink device.

17. A machine-readable medium encoded with instructions, that when executed by one or more processors, cause the processor to carry out a process for dynamically updating addresses of daisy-chained devices in an uncompressed multimedia communication system, the process comprising:
  receiving at a downstream device uncompressed multimedia data serially transmitted over a single communication channel from an upstream device, the data in a data format that specifies upstream device address;
  detecting at the downstream device that the address of the upstream device has changed; and
  automatically adjusting the address of the downstream device based on the upstream device address.

18. The machine-readable medium of claim 17 wherein the multimedia system is configured for transmission of multiple uncompressed multimedia streams in the single communication channel, and the data format further specifies to which stream each multimedia packet belongs.

19. The machine-readable medium of claim 18 wherein the downstream device is a sink device, the process further comprising:
  comparing at the sink device a received stream number with a programmed stream number associated with the sink device; and
  providing multimedia data having a stream number that matches the programmed stream number to local video/audio processing circuitry.

20. The machine-readable medium of claim 18 wherein the downstream device is a sink device, the process further comprising:
  comparing at the sink device a received stream number with a programmed stream number associated with the sink device; and
  relaying multimedia data having a stream number that does not match the programmed stream number to a next downstream device.

21. The machine-readable medium of claim 18 wherein the downstream device is a sink device, and a programmed stream number is assigned to the downstream device by the process, further comprising:
  detecting available multimedia streams;
  providing a list of the available multimedia streams for display;
  receiving a user stream selection; and
  assigning the programmed stream number to the sink device based on the user stream selection.

22. The machine-readable medium of claim 17 wherein the data format further specifies timing information between a source device and a sink device, the process further comprising:
  receiving at the sink device control signal change data including control signal values and time at which each change occurs relative to a first pixel time of each packet received;
  counting pixels from first pixel for each data packet received; and
  regenerating control timing signal for each packet based on pixel count.

23. The machine-readable medium of claim 17 wherein the data format further specifies timing information between a source device and a sink device, the process further comprising:
  detecting at the source device control signal change data;
  counting pixels from first pixel for each data packet received;
  recording control signal change data including control signal values and time at which each change occurs relative to a first pixel time of each packet received; and
  forwarding the control signal change data to the sink device.

* * * * *